US012612881B2

(12) United States Patent
Andrzejewski et al.

(10) Patent No.: US 12,612,881 B2
(45) Date of Patent: Apr. 28, 2026

(54) EVAPORATIVE EMISSIONS CONTROL SYSTEM

(71) Applicant: GM GLOBAL TECHNOLOGY OPERATIONS LLC, Detroit, MI (US)

(72) Inventors: Jason M. Andrzejewski, Washington, MI (US); Chao Wan, Shanghai (CN); Wenshui Wang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/918,919

(22) Filed: Oct. 17, 2024

(65) Prior Publication Data

US 2026/0071583 A1 Mar. 12, 2026

(30) Foreign Application Priority Data

Sep. 9, 2024 (CN) ........................ 202411258940.0

(51) Int. Cl.

*F02M 25/08* (2006.01)
*F02D 41/00* (2006.01)

(52) U.S. Cl.

CPC ....... *F02D 41/003* (2013.01); *F02M 25/0836* (2013.01)

(58) Field of Classification Search

CPC .. F02M 25/0836; F02M 25/089; F02M 25/08; F02M 25/0854; F02M 25/0872; F02M 37/0023; F02M 37/0076; F02D 41/0032; F02D 41/003; B01D 2259/4516

See application file for complete search history.

(56) References Cited

U.S. PATENT DOCUMENTS

| | | | | | |
|---|---|---|---|---|---|
| 4,040,404 | A * | 8/1977 | Tagawa | B60K 15/03519 | 137/493.2 |
| 5,431,144 | A * | 7/1995 | Hyodo | B60K 15/03519 | 123/541 |
| 6,017,061 | A | 1/2000 | Adachi | | |
| 2002/0157715 | A1* | 10/2002 | Viebahn | F02M 37/0082 | 137/588 |
| 2010/0294251 | A1* | 11/2010 | Makino | F02M 37/20 | 123/519 |
| 2017/0145962 | A1* | 5/2017 | Dudar | F02M 25/0872 | |

FOREIGN PATENT DOCUMENTS

| | | | | |
|---|---|---|---|---|
| AT | 006943 U1 | 6/2004 | | |
| CN | 220242977 U | 12/2023 | | |
| DE | 10007522 A1 | 8/2001 | | |
| DE | 102014018041 A1 * | 6/2015 | F02D 41/2464 | |
| DE | 102021112564 A1 * | 4/2022 | B60K 15/035 | |

OTHER PUBLICATIONS

German Office Action from counterpart DE1020241299630, dated Apr. 22, 2025.

* cited by examiner

*Primary Examiner* — George C Jin
*Assistant Examiner* — Teuta B Holbrook

(57) ABSTRACT

A vehicle emissions control system including: a fuel tank; a canister including a material configured to absorb fuel vapors released from liquid fuel stored within the fuel tank; a pressure relief valve configured to open to vent the fuel tank and permit the fuel vapors and the liquid fuel to flow out of the fuel tank; and a fuel separator configured to change a flow velocity of fuel flowing from the fuel tank to separate the fuel vapors from the liquid fuel, the fuel separator in fluid communication with the fuel tank and the canister to direct the fuel vapors to the canister and direct the liquid fuel away from the canister.

13 Claims, 3 Drawing Sheets

EVAPORATIVE EMISSIONS CONTROL SYSTEM

CROSS-REFERENCE TO RELATED APPLICATIONS

This application claims the benefit of Chinese Patent Application No. 202411258940.0 filed on Sep. 9, 2024. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an evaporative emissions control system, such as for a vehicle.

An evaporative emissions control (EVAP) system captures fuel vapors that may evaporate from fuel stored in a fuel tank. A vehicle EVAP system captures hydrocarbon vapors that may be released during diurnal breathing or refueling, for example, and prevents the hydrocarbon vapors from being released into the environment. The hydrocarbon vapors are captured by an EVAP canister including activated carbon, charcoal, or any other material suitable for capturing the hydrocarbon vapors. The hydrocarbon vapors may ultimately be directed to a combustion chamber of the engine to facilitate combustion.

SUMMARY

The present disclosure includes, in various features, a vehicle emissions control system including: a fuel tank; a canister including a material configured to absorb fuel vapors released from liquid fuel stored within the fuel tank; a pressure relief valve configured to open to vent the fuel tank and permit the fuel vapors and the liquid fuel to flow out of the fuel tank; and a fuel separator configured to change a flow velocity of fuel flowing from the fuel tank to separate the fuel vapors from the liquid fuel, the fuel separator in fluid communication with the fuel tank and the canister to direct the fuel vapors to the canister and direct the liquid fuel away from the canister.

In further features, the pressure relief valve is between the fuel tank and the fuel separator.

In further features, the pressure relief valve is between the fuel separator and the canister.

In further features, the system includes a nozzle along a fuel line extending from the fuel tank to the fuel separator, the nozzle configured to increase a rate of fuel flow from the fuel tank to the separator.

In further features, the system includes a control module in communication with the pressure relief valve and a pressure sensor configured to measure pressure within the fuel tank, the control module configured to open the pressure relief valve when pressure within the fuel tank exceeds a predetermined value.

In further features, the material configured to absorb fuel vapors includes activated carbon.

In further features, the fuel separator is along a fuel line between the fuel tank and the canister.

In further features, the fuel separator is included in a common housing with the fuel tank.

In further features, the fuel separator includes a cone-shaped chamber configured to induce cyclonic flow of the liquid fuel that separates the liquid fuel from the fuel vapors.

In further features, the system includes a return line extending from the cone-shaped chamber to the fuel tank to direct the liquid fuel separated from the fuel vapors back to the fuel tank.

In further features, the fuel separator includes a vertical partition wall along a flow path to the canister, the vertical partition wall configured to change the flow velocity of fuel to separate the liquid fuel from the fuel vapors.

In further features, the fuel separator includes a fuel line extending between the fuel tank and the canister, the fuel line including a first area of a first diameter, a second area of a second diameter, and an intermediate area between the first area and the second area; the second area is downstream of the first area in a direction towards the canister, and the second diameter is greater than the first diameter; the intermediate area includes an outlet connected to a return line extending from the fuel separator back to the fuel tank; and the fuel separator is configured to reduce the flow velocity of the fuel as the fuel flows from the first area to the second area to separate the liquid fuel from the fuel vapors such that the liquid fuel flows through the outlet to the fuel tank and the fuel vapors flow through the second area to the canister.

In further features, the second area is higher than the first area, and the intermediate area extends from the first area to the second area at an incline.

The present disclosure further discloses, in various features, a vehicle emissions control system including: a fuel tank; a canister including a material configured to absorb fuel vapors released from liquid fuel stored within the fuel tank; a diurnal control valve configured to open to vent the fuel tank and permit the fuel vapors and the liquid fuel to flow out of the fuel tank; and a fuel separator including a cone-shaped chamber configured to induce cyclonic flow of the liquid fuel that separates the liquid fuel from the fuel vapors, the fuel separator in fluid communication with the fuel tank and the canister to direct the fuel vapors to the canister and direct the liquid fuel away from the canister.

In further features, the system includes a venturi nozzle along a fuel line extending from the fuel tank to the fuel separator, the venturi nozzle configured to increase a rate of fuel flow from the fuel tank to the separator.

In further features, a control module is in communication with the diurnal control valve and a pressure sensor configured to measure pressure within the fuel tank, the control module configured to open the diurnal control valve when pressure within the fuel tank exceeds a predetermined value.

In further features, a return line extends from the cone-shaped chamber to the fuel tank to direct the liquid fuel separated from the fuel vapors back to the fuel tank.

The present disclosure also discloses, in various features, a vehicle emissions control system including: a fuel tank; a canister including a material configured to absorb fuel vapors released from liquid fuel stored within the fuel tank; a diurnal control valve configured to open to vent the fuel tank and permit the fuel vapors and the liquid fuel to flow out of the fuel tank; and a fuel separator. The fuel separator includes: a cone-shaped chamber configured to induce cyclonic flow of the liquid fuel that separates the liquid fuel from the fuel vapors, the fuel separator in fluid communication with the fuel tank and the canister to direct the fuel vapors to the canister and direct the liquid fuel away from the canister; a return line extending from the cone-shaped chamber to the fuel tank to direct the liquid fuel separated from the fuel vapors back to the fuel tank; and a partition wall along a flow path to the canister, the partition wall configured to change a flow velocity of fuel to separate the liquid fuel from the fuel vapors.

In further features, the system includes a venturi nozzle along a fuel line extending from the fuel tank to the fuel separator, the venturi nozzle configured to increase a rate of fuel flow from the fuel tank to the separator.

In further features, a control module is in communication with the diurnal control valve and a pressure sensor configured to measure pressure within the fuel tank, the control module configured to open the diurnal control valve when pressure within the fuel tank exceeds a predetermined value.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is directed to an emissions control system. The emissions control system is configured to control fuel vapor emissions of fuel for any suitable engine, such as an engine for a vehicle. The teachings of the present disclosure are also applicable to any suitable non-vehicular application as well.

With respect to vehicle engines, the emissions control system is configured to separate liquid fuel and hydrocarbon fuel vapors that may be present as a result of diurnal breathing and/or during refueling. The emissions control system is configured for use with, for example, hybrid vehicles equipped with a Non-Integrated Refueling Canister Only (NIRCO) system in which the fuel system is sealed under pressure. The emissions control system includes a separator, which is configured to separate liquid fuel from hydrocarbon fuel vapors, and direct the liquid fuel away from an evaporative emissions (EVAP) canister including activated carbon for trapping the hydrocarbon vapors. Directing the liquid fuel away from the canister and the activated carbon therein prevents the activated carbon from being subject to moisture, which may reduce the effectiveness of the activated carbon (or any other suitable material present in the canister for trapping the hydrocarbon vapors).

Figure 1:
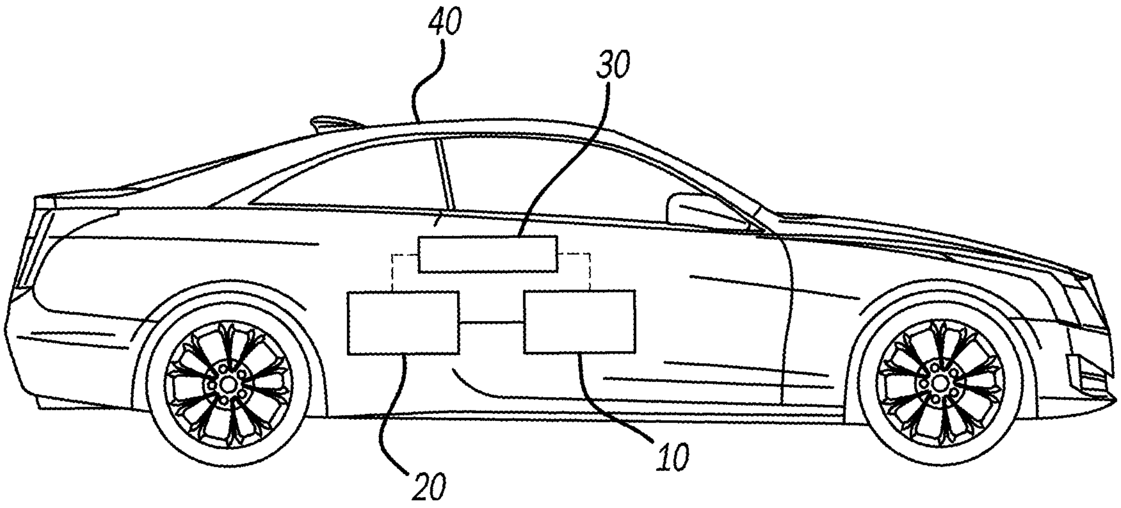
FIG. 1 is a side view of a vehicle including an exemplary evaporative emissions control system in accordance with the present disclosure.
Figure 2:
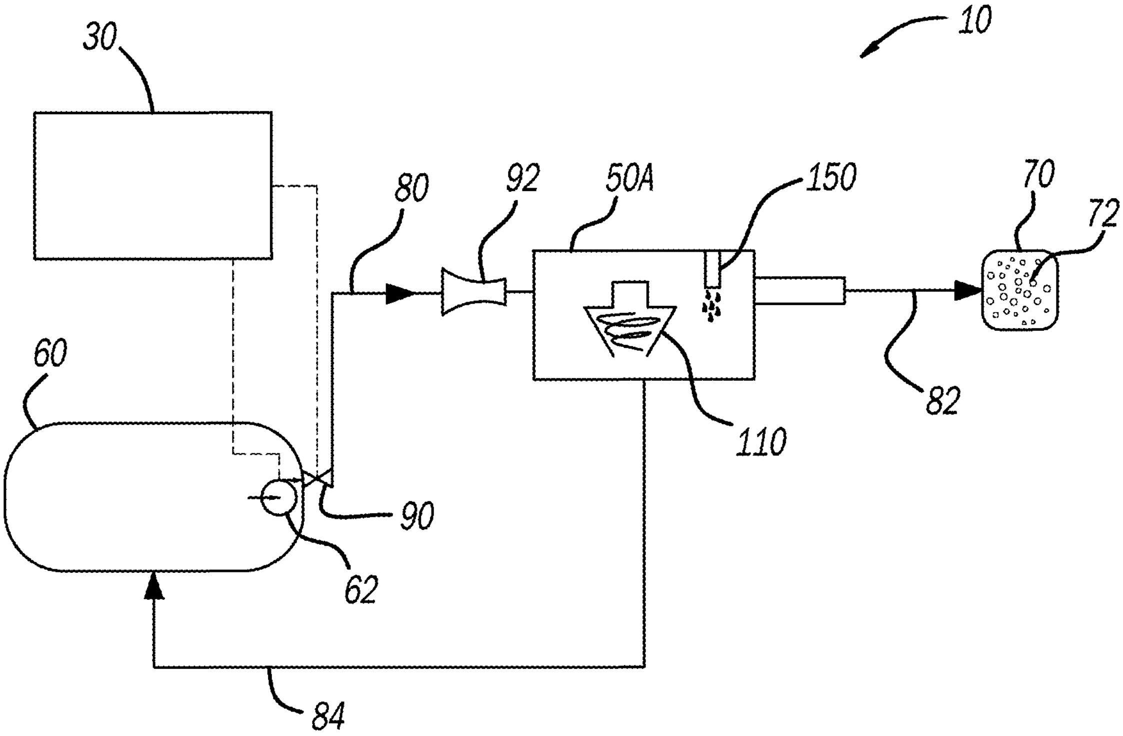
FIG. 2 is a diagram of an exemplary evaporative emissions control system in accordance with the present disclosure.

FIGS. 1 and 2 illustrate an exemplary emissions control system 10 in accordance with the present disclosure. The system 10 is configured for use in conjunction with any suitable engine, such as a hybrid engine 20, and is operable by a control module 30. The system 10 may be configured as a vehicle emissions control system for any suitable vehicle 40. The system 10 is configured for use with any suitable nonvehicular application as well.

With particular reference to FIG. 2, the emissions control system 10 includes a separator 50A, which is configured to receive fuel from the fuel tank 60 and separate hydrocarbon fuel vapors from liquid fuel, as explained in detail herein. The system 10 directs the fuel vapors to a canister 70, which includes a material 72 configured to trap the fuel vapors to prevent the fuel vapors from escaping to the surrounding environment. The material 72 may be any material suitable to trap the hydrocarbon fuel vapors, such as activated carbon, charcoal, etc.

A fuel line 80 extends from the fuel tank 60 to the separator 50A. Another fuel line 82 extends from the separator 50A to the canister 70. A return line 84 extends from the separator 50A back to the fuel tank 60 to return liquid fuel back to the fuel tank 60.

Figure 5:
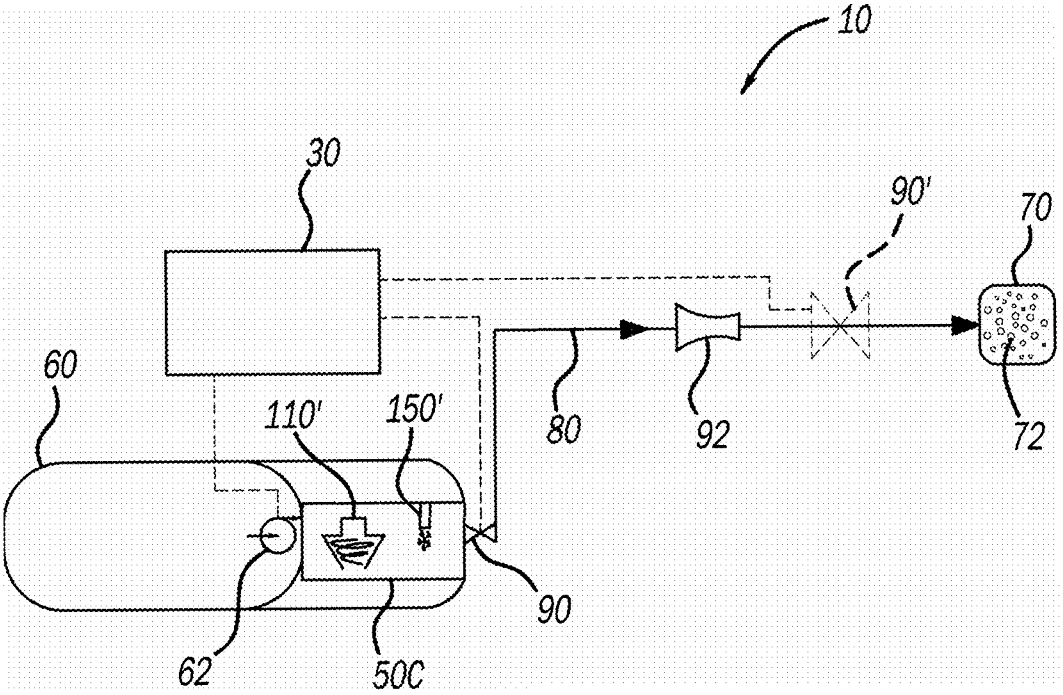
FIG. 5 is a diagram of another exemplary evaporative emissions control system in accordance with the present disclosure.

The fuel tank 60 includes a pressure sensor 62, which is configured to measure pressure within the fuel tank 60. The system 10 further includes a pressure relief valve 90. When opened, the pressure relief valve 90 allows fuel to exit the fuel tank 60 to reduce fuel pressure within the system 10 and allow fuel to flow from the fuel tank 60 to the separator 50A. The pressure relief valve 90 may be at any suitable location about the system 10. For example, the pressure relief valve 90 may be at an outlet of the fuel tank 60, at any suitable location along the fuel line 80, or at any suitable location along the fuel line 82. For example, FIG. 5 illustrates a pressure relief valve 90' proximate to the canister 70. The pressure relief valve 90 may be configured as a diurnal valve, for example, configured to be opened to relieve pressure resulting from release of hydrocarbon fuel vapors from liquid fuel within the fuel tank 60 during diurnal breathing. The pressure relief valve 90 may also be configured to open to relieve pressure resulting from the release of hydrocarbon vapors during refueling.

The control module 30 is in communication with at least the pressure sensor 62 and the pressure relief valve 90. The control module 30 is configured to open the pressure relief valve 90 when pressure within the fuel tank 60 reaches or exceeds any suitable predetermined pressure. The control module 30 is in communication with the pressure sensor 62 to receive inputs from the pressure sensor 62 identifying the pressure within the fuel tank 60. When based on inputs from the pressure sensor 62 the control module 30 identifies that the pressure within the fuel tank 60 is at or above the predetermined temperature, the control module 30 is configured to open the pressure relief valve 90. Opening the pressure relief valve 90 vents the fuel tank 60 to allow hydrocarbon fuel vapors to flow out of the fuel tank 60. Liquid fuel may exit the fuel tank 60 along with the hydrocarbon fuel vapors.

The emissions control system 10 further includes a nozzle 92, which may be configured as a venturi nozzle. The nozzle 92 is configured to increase flow velocity of fuel flowing out from within the fuel tank 60 when the pressure relief valve 90 is opened. The nozzle 92 is along the fuel line 80 in the example of FIG. 2. The nozzle 92 may alternatively be located along the fuel line 82 between the separator 50A and the canister 70, or at any other suitable location within the system 10.

Figure 3:
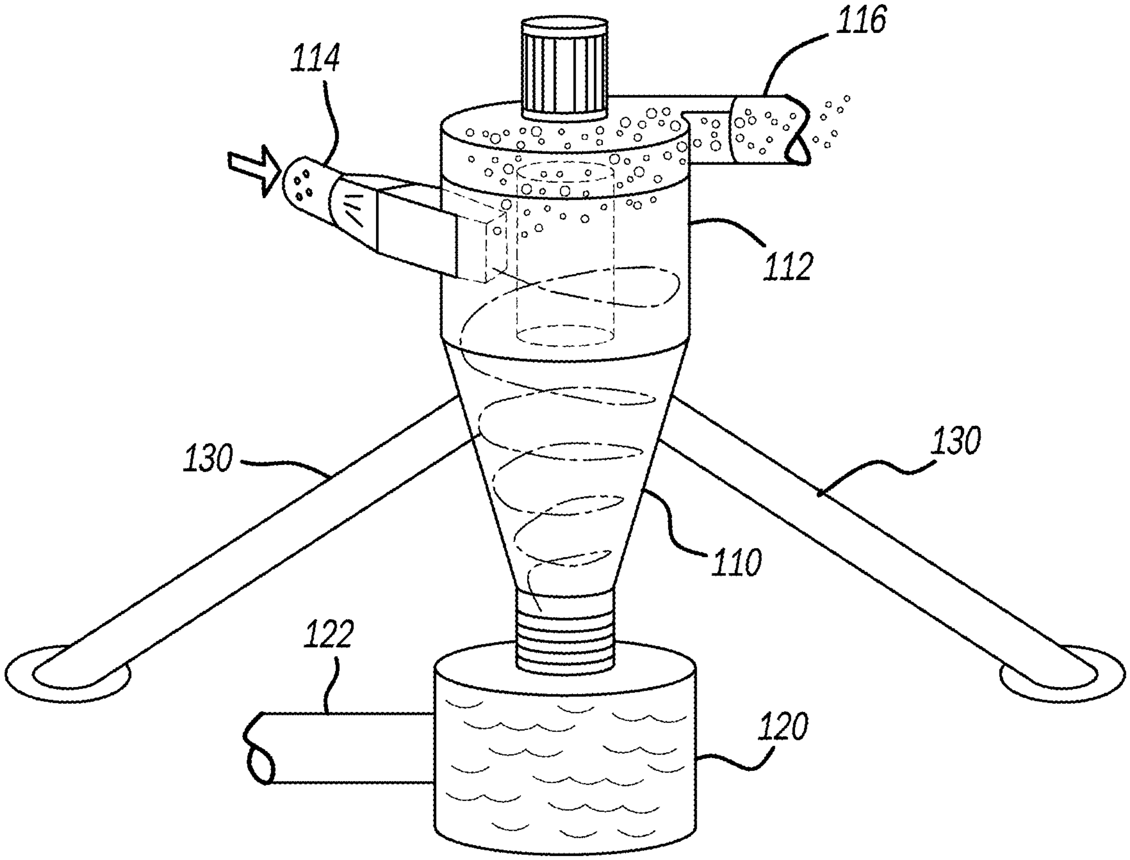
FIG. 3 is a perspective view of an exemplary fuel separator of an evaporative emissions control system of the present disclosure, the fuel separator including a cone-shaped chamber configured to induce cyclonic fuel flow.

With continued reference to FIG. 2, and additional reference to FIG. 3, the separator 50A will now be described in additional detail. The separator 50A includes a cone-shaped chamber 110. Above the cone-shaped chamber 110 is an upper chamber 112. At the upper chamber 112 is an upper inlet 114 and an upper outlet 116. The upper inlet 114 is in cooperation with the fuel line 80 to direct into the upper chamber 112 the hydrocarbon fuel vapors and liquid fuel that has exited the fuel tank 60 in response to the pressure relief valve 90 being opened. The upper outlet 116 is in cooperation with the fuel line 82 to direct hydrocarbon fuel vapors to the canister 70.

Below the cone-shaped chamber 110 is a lower chamber 120. A lower outlet 122 extends from the lower chamber and is connected to the return line 84. Support members 130 may be included to support the cone-shaped chamber 110 on any suitable surface and/or in any suitable housing. The separator 50A may be arranged above the fuel tank 60 as generally illustrated in FIG. 2. The separator 50A may alternatively be arranged in a common plane with the fuel tank 60, or even below the fuel tank 60 in some applications.

When the pressure relief valve 90 is opened, such as by the control module 30, the mixture of hydrocarbon fuel vapors and liquid fuel exits the fuel tank 60, and flows through the fuel line 80 to the separator 50A. The mixture enters the upper chamber 112 of the separator 50A through the upper inlet 114 at a velocity elevated as a result of the mixture having passed through the (venturi) nozzle 92. In the upper chamber 112, the relatively more dense and heavier liquid fuel flows downward into the cone-shaped chamber 110. The less dense and lighter hydrocarbon fuel vapors remain in the upper chamber 112 and ultimately exit the upper chamber 112 through the upper outlet 116. From the upper outlet 116, the fuel vapors flow to the canister 70.

Due to the cyclonic flow of the liquid fuel caused by the cone-shaped chamber 110, centripetal force will be introduced, which is $V^2/R$. Hydrocarbon vapors with less density will move at a greater velocity as compared to liquid fuel so that vapor will be engulfed into a center of the cone-shaped chamber 110 while fuel liquid will accumulate at a cone boarder. Under the combination of gravity and centripetal force, vapor and liquid are separated. The cyclonic action pulls the liquid flow down through the cone-shaped chamber 110 into the lower chamber 120. From the lower chamber 120, the liquid fuel exits through the lower outlet 122 and returns to the fuel tank 60 through the return line 84. The relatively lighter hydrocarbon vapors, which are moving relatively faster in the upper chamber 112 than the liquid fuel in the cone-shaped chamber 110, exit the upper chamber 112 through the upper outlet 116. From the upper chamber 112, the hydrocarbon vapors exit through the upper outlet 116 and ultimately flow to the canister 70. In the canister 70, the hydrocarbon vapors are trapped in the activated carbon, the charcoal, or any other suitable material.

The separator 50A may also include a partition wall 150. The partition wall 150 may be arranged within the upper chamber 112 proximate to the upper outlet 116. The partition wall 150 may alternatively be arranged outside of the upper chamber 112 at any suitable location within the system 10 downstream of the fuel tank 60. The partition wall 150 may be vertical, or substantially vertical. When the mixture of the hydrocarbon fuel vapors and liquid fuel contacts the partition wall 150, the partition wall 150 will deflect the liquid fuel down into the cone-shaped chamber 110. The hydrocarbon fuel vapors will flow around the partition wall 150 to the upper outlet 116, and ultimately to the canister 70. When the mixture of hydrocarbon fuel vapors and the liquid fuel contacts the partition wall 150, velocity of the liquid fuel will change relative to the fuel vapors to further separate the liquid fuel from the fuel vapors.

Figure 4:
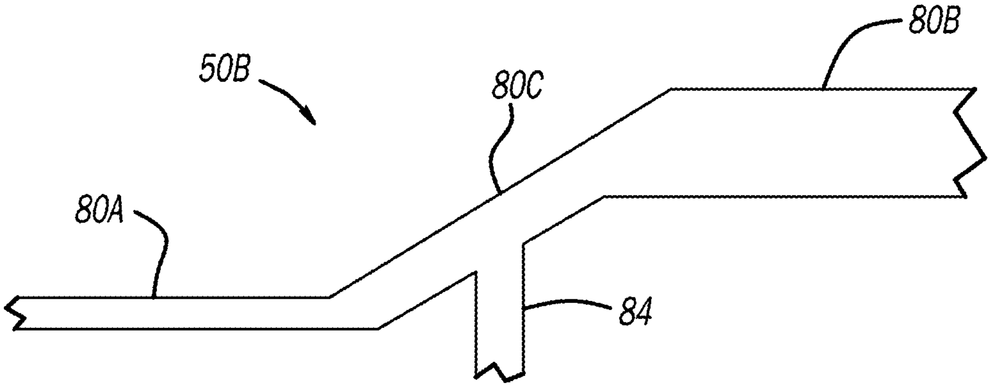
FIG. 4 is a side view of another exemplary fuel separator of the present disclosure, the fuel separator including a fuel line having a first diameter and a second diameter that is greater than the first diameter.

FIG. 4 illustrates another separator 50B in accordance with the present disclosure. The separator 50B includes a first area 80A of the fuel line 80, a second area 80B of the fuel line 80, and an intermediate area 80C of the fuel line 80. The first area 80A has a diameter that is smaller than the second area 80B. The intermediate area 80C may have a diameter that is the same as, or larger than, the first area 80A. The intermediate area 80C may be angled as illustrated such that the second area 80B is relatively higher than the first area 80A. Alternatively, the first area 80A, the second area 80B, and the intermediate area 80C may all be aligned linearly. The separator 50B is configured to change the velocity of the fuel as the hydrocarbon fuel vapors and the liquid fuel flow through the fuel line 80. Specifically, as the fuel flows from the smaller diameter first area 80A to the larger diameter second area 80B, the velocity of the fuel will decrease. The heavier liquid fuel (along with any dirt, dust, etc. that may be present) will exit through the return line 84, and be returned to the fuel tank 60. The lighter hydrocarbon fuel vapors will continue to the canister 70, where the vapors are trapped or otherwise absorbed by the material 72.

FIG. 5 illustrates the system 10 with various alternate configurations in accordance with the present disclosure. As illustrated in FIG. 5, the pressure relief valve 90' may be spaced apart from the fuel tank 60, and arranged downstream of the fuel tank 60 along the fuel line 80, such as proximate to the canister 70 and downstream of the nozzle 92. A separator 50C may be packaged integral with the fuel tank 60, such as in a common housing. For example, the separator 50C may be inside the fuel tank 60. The separator 50C is the same as, or substantially similar to, the separator 50A but for the location of the separator 50C being packaged together with the fuel tank 60. The separator 50C includes a cone-shaped chamber 110' and a partition wall 150', each of which are the same as, or similar to, the cone-shaped chamber 110 and the partition wall 150. Thus, the description of the cone-shaped chamber 110 and the partition wall 150 also applies to the cone-shaped chamber 110' and the partition wall 150'.

The present disclosure thus provides for the emissions control system 10 including one or more separators 50A, 50B, 50C to separate liquid fuel from hydrocarbon fuel vapors. As a result, little or no liquid fuel enters the canister 70, which keeps the material 72 dry and allows the material 72 to trap and otherwise capture the fuel vapors within the canister 70. The system 10 of the present disclosure is configured to be included in any suitable sealed fuel system. Such fuel systems operate at pressure above barometric pressure due to the natural diurnal heating/cooling that takes place throughout the day. When ambient temperature rises, pressure within the fuel tank 60 may increase. The increased pressure within the fuel tank 60 is relieved by opening the pressure relief valve 90. When the valve 90 is opened, both liquid fuel and fuel vapors may be released. The separators 50A, 50B, and 50C are configured to separate the liquid fuel from the fuel vapors so that only the fuel vapors flow to the canister 70, thereby protecting the material 72 from moisture contamination resulting from contact with liquid fuel.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle emissions control system comprising:

a fuel tank;

a canister including a material configured to absorb fuel vapors released from liquid fuel stored within the fuel tank;

a pressure relief valve configured to open to vent the fuel tank and permit the fuel vapors and the liquid fuel to flow out of the fuel tank;

a pressure sensor configured to measure a pressure within the fuel tank;

a fuel separator outside of the fuel tank and connected to the fuel tank with a fuel line, the fuel separator configured to change a flow velocity of fuel flowing from the fuel tank to separate the fuel vapors from the liquid fuel, the fuel separator in fluid communication with the fuel tank and the canister to direct the fuel vapors to the canister and direct the liquid fuel away from the canister;

a return line extending from the fuel separator to the fuel tank to direct the liquid fuel separated from the fuel vapors back to the fuel tank; and a control module in communication with the pressure relief valve and the pressure sensor, the control module configured to open the pressure relief valve when pressure within the fuel tank exceeds a predetermined value, wherein the fuel separator includes a cone-shaped chamber configured to induce cyclonic flow of the liquid fuel that separates the liquid fuel from the fuel vapors.

2. The vehicle emissions control system of claim 1, wherein the pressure relief valve is between the fuel tank and the fuel separator.

3. The vehicle emissions control system of claim 1, wherein the pressure relief valve is between the fuel separator and the canister.

4. The vehicle emissions control system of claim 1, further comprising a nozzle along a fuel line extending from the fuel tank to the fuel separator, the nozzle configured to increase a rate of fuel flow from the fuel tank to the fuel separator.

5. The vehicle emissions control system of claim 1, wherein the material configured to absorb fuel vapors includes activated carbon.

6. The vehicle emissions control system of claim 1, wherein the fuel separator is along a fuel line between the fuel tank and the canister.

7. The vehicle emissions control system of claim 1, wherein the fuel separator is included in a common housing with the fuel tank.

8. The vehicle emissions control system of claim 1, wherein the return line extends from the cone-shaped chamber to the fuel tank to direct the liquid fuel separated from the fuel vapors back to the fuel tank.

9. The vehicle emissions control system of claim 1, wherein the fuel separator further includes a vertical partition wall along a flow path to the canister, the vertical partition wall configured to change the flow velocity of fuel to separate the liquid fuel from the fuel vapors.

10. A vehicle emissions control system comprising:

a fuel tank;

a canister including a material configured to absorb fuel vapors released from liquid fuel stored within the fuel tank;

a diurnal control valve configured to open to vent the fuel tank and permit the fuel vapors and the liquid fuel to flow out of the fuel tank;

a pressure sensor configured to measure a pressure within the fuel tank;

a fuel separator outside of the fuel tank and connected to the fuel tank with a fuel line, the fuel separator including a cone-shaped chamber configured to induce cyclonic flow of the liquid fuel that separates the liquid fuel from the fuel vapors, the fuel separator in fluid communication with the fuel tank and the canister to direct the fuel vapors to the canister and direct the liquid fuel away from the canister;

a return line extending from the fuel separator to the fuel tank to direct the liquid fuel separated from the fuel vapors back to the fuel tank; and a control module in communication with the diurnal control valve and the pressure sensor, the control module configured to open the diurnal control valve when pressure within the fuel tank exceeds a predetermined value, wherein the fuel separator includes a cone-shaped chamber configured to induce cyclonic flow of the liquid fuel that separates the liquid fuel from the fuel vapors.

11. The vehicle emissions control system of claim 10, further comprising a venturi nozzle along the fuel line extending from the fuel tank to the fuel separator, the venturi nozzle configured to increase a rate of fuel flow from the fuel tank to the fuel separator.

12. A vehicle emissions control system comprising:

a fuel tank;

a canister including a material configured to absorb fuel vapors released from liquid fuel stored within the fuel tank;

a diurnal control valve configured to open to vent the fuel tank and permit the fuel vapors and the liquid fuel to flow out of the fuel tank;

a pressure sensor configured to measure pressure within the fuel tank; and a fuel separator outside of the fuel tank and connected to the fuel tank with a fuel line, the fuel separator including:

a cone-shaped chamber configured to induce cyclonic flow of the liquid fuel that separates the liquid fuel from the fuel vapors, the fuel separator in fluid communication with the fuel tank and the canister to direct the fuel vapors to the canister and direct the liquid fuel away from the canister, a return line extending from the cone-shaped chamber to the fuel tank to direct the liquid fuel separated from the fuel vapors back to the fuel tank, and a partition wall along a flow path to the canister, the partition wall configured to change a flow velocity of fuel to separate the liquid fuel from the fuel vapors; and a control module in communication with the diurnal control valve and the pressure sensor, the control module configured to open the diurnal control valve when pressure within the fuel tank exceeds a predetermined value.

13. The vehicle emissions control system of claim 12, further comprising a venturi nozzle along the fuel line extending from the fuel tank to the fuel separator, the venturi nozzle configured to increase a rate of fuel flow from the fuel tank to the fuel separator.

* * * * *